United States Patent [19]

Papa et al.

[11] 4,250,091
[45] Feb. 10, 1981

[54] WATER-SOLUBLE DISAZO DYESTUFF DERIVED FROM 4,4-DIAMINOBENZANILIDE

[76] Inventors: Sisto S. Papa, 108, Viale Zara; Antonino Condo, 16, Via Mercalli, both of Milan, Italy

[21] Appl. No.: 36,569

[22] Filed: May 7, 1979

Related U.S. Application Data

[63] Continuation of Ser. No. 828,310, Aug. 29, 1977, abandoned, which is a continuation of Ser. No. 702,871, Jul. 6, 1976, abandoned, which is a continuation of Ser. No. 542,938, Jan. 22, 1975, abandoned.

[30] Foreign Application Priority Data

Jan. 30, 1974 [IT] Italy .................. 19963 A/74

[51] Int. Cl.³ ............ C09B 31/14; C09B 35/18; C09B 33/12
[52] U.S. Cl. ...................... 260/160; 260/161
[58] Field of Search ............... 260/160, 161

[56] References Cited

U.S. PATENT DOCUMENTS

| 936,367 | 7/1909 | Schedler ........................ 260/160 |
| 2,571,990 | 10/1951 | Stratton ........................ 260/161 X |
| 3,467,645 | 9/1969 | Keller et al. .................. 260/160 X |

FOREIGN PATENT DOCUMENTS 957336  5/1961  United Kingdom ............. 260/160

OTHER PUBLICATIONS

Szadowski et al., "Chem. Abs.," 79, No. 4, 7/30/73, No. 20278f.

"Chem. Abs.," 79, Formula Index, $C_{33}H_{28}N_{10}O_9S_2$, 1973.

*Primary Examiner*—Paul F. Shaver
*Attorney, Agent, or Firm*—Hubbell, Cohen, Stiefel & Gross

[57] ABSTRACT

The sulfonated disazo dyestuff of the formula:

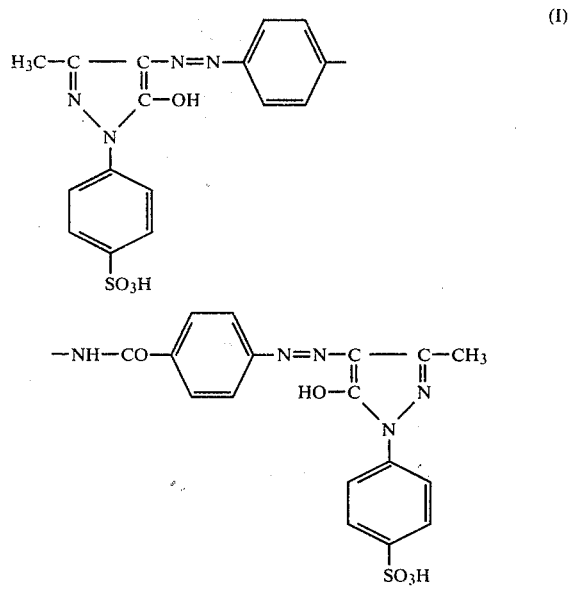

is useful in dyeing cotton and other cellulosic fibers.

1 Claim, No Drawings

WATER-SOLUBLE DISAZO DYESTUFF DERIVED FROM 4,4-DIAMINOBENZANILIDE

CROSS REFERENCE TO RELATED APPLICATIONS:

This is a continuation of application Ser. No. 828,310, filed Aug. 29, 1977, which is in turn a continuation of application Ser. No. 702,871, filed July 6, 1976, which is in turn a continuation of application Ser. No. 542,938, filed Jan. 22, 1975 all now abandoned.

DESCRIPTION OF THE INVENTION

The present invention relates to a new sulfonated disazo dyestuff which is well suited for the direct dyeing of cotton and other cellulosic fibers such as linen, regenerated cellulose fibers, hemp, jute and the like.

The invention provides a new water-soluble disazo dyestuff of the formula:

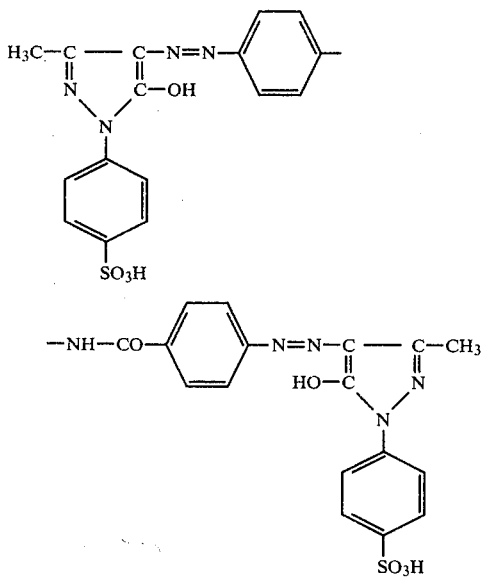

This direct dyestuff has application characteristics which are similar to those of conventional direct dyestuffs, for example, dyestuffs of the benzidine series, but the process for its manufacture does not involve any toxicological risks. Actually, benzidine, and its derivatives which are used for preparing conventional dyestuffs having characteristics which are similar to those according to the invention, are hazardous substances i.e., they are carcinogenic and therefore require strict and carefully controlled conditions.

On cellulosic fibers, the dyestuff of the invention produces orange shades. Dyeing of fibers with the dyestuff of the invention is carried out using the same methods as are used with conventional direct dyestuffs, i.e., at a temperature ordinarily ranging from 50° to 100° C., using a water-bath containing adequate quantities e.g.-from 0,01 g of 2–3% about or according to the user's exigence of dyestuff and from 5 to 20% (with respect to the weight of the fiber) of anhydrous $Na_2SO_4$ or NaCl.

The following example is given to illustrate the invention, all parts being understood as parts by weight unless otherwise stated.

EXAMPLE 22.7 parts of 4-4'-diamino-benzanilide suspended in 50 parts of water and 52 parts of 20° Bé hydrochloric acid were tetra-azotized, after cooling with 150 parts of ice, by adding dropwise at 0°–5° C., in 30 minutes a solution of 14 parts of $NaNO_2$ in 60 parts of $H_2O$. After 60 minutes stirring, the excess nitrous acid was removed with sulfamic acid. 50.8 parts of 1-N-parasulfophenyl-3-methyl-5-pyrazolone were dissolved in 300 parts $H_2O$ at 60° C. and 40 parts $Na_2CO_3$ at a pH of 8.5–9. After cooling to below 5° C., by adding 150 parts of ice, the tetra-azotization mass was rapidly poured in over a period of 5 minutes at a pH of 7.5–8. The whole was kept under stirring overnight, while allowing the temperature to rise to room temperature, i.e., about 20° C. The following morning the mass was completely solubilized by addition of 20 parts of 36° Bé NaOH and heating to 70°–80° C. The dyestuff was precipitated by salting with 110 parts about of rock salt. To complete the precipitation, the whole mass was acidified to Congo red with 40 parts of 20° Bé HCl. The mass was filtered under vacuum and squeezed dry.

The obtained product, dried at 70°–80° C., dyes cellulose fibers with orange shades and excellent uniformity.

Modifications and variations can, of course, be made without departing from the spirit and scope of the invention.

Having thus described our invention, what we desire to secure by Letters Patent and hereby claim is:

1. The sulfonated disazo dyestuff of the formula:

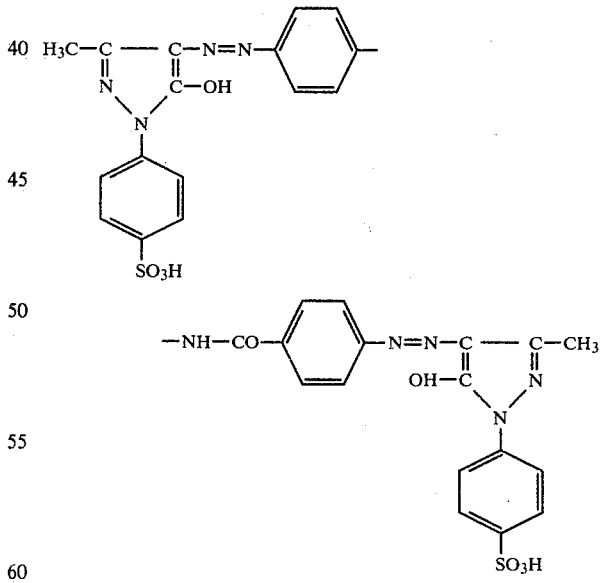

* * * * *